(12) United States Patent
Hung et al.

(10) Patent No.: US 7,712,451 B2
(45) Date of Patent: May 11, 2010

(54) MULTI-FUEL MULTI-INJECTION SYSTEM FOR AN INTERNAL COMBUSTION ENGINE

(75) Inventors: David Ling-Shun Hung, Novi, MI (US); George Guoming Zhu, Novi, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 94 days.

(21) Appl. No.: 12/116,451

(22) Filed: May 7, 2008

(65) Prior Publication Data

US 2009/0277432 A1    Nov. 12, 2009

(51) Int. Cl.
*F02B 7/00* (2006.01)
*F02B 7/06* (2006.01)

(52) U.S. Cl. .................... 123/431; 123/575

(58) Field of Classification Search ............... 123/304, 123/431, 299, 432, 302, 575, 576, 577, 578; 701/103
See application file for complete search history.

(56) References Cited

U.S. PATENT DOCUMENTS

| | | | |
|---|---|---|---|
| 4,499,862 A * | 2/1985 | Baumer et al. | 123/1 A |
| 4,705,010 A * | 11/1987 | Baranescu | 123/575 |
| 6,145,494 A * | 11/2000 | Klopp | 123/525 |
| 6,314,940 B1 | 11/2001 | Frey et al. | |
| 6,516,774 B2 | 2/2003 | zur Loye et al. | |
| 6,561,157 B2 | 5/2003 | zur Loye et al. | |
| 6,659,071 B2 | 12/2003 | LaPointe et al. | |
| 6,684,852 B2 | 2/2004 | Wright et al. | |
| 6,789,511 B2 | 9/2004 | Hertweck et al. | |
| 6,845,608 B2 * | 1/2005 | Klenk et al. | 60/274 |
| 7,121,254 B2 * | 10/2006 | Wickman et al. | 123/304 |
| 7,143,739 B2 | 12/2006 | Brachert et al. | |
| 7,159,568 B1 | 1/2007 | Lewis et al. | |
| 7,178,503 B1 | 2/2007 | Brehob | |
| 7,255,080 B1 | 8/2007 | Leone | |
| 7,278,396 B2 | 10/2007 | Leone et at | |
| 7,287,492 B2 | 10/2007 | Leone et al. | |
| 7,337,762 B2 | 3/2008 | Eng et al. | |
| 2006/0102136 A1 | 5/2006 | Broomberg et al. | |
| 2006/0102145 A1 | 5/2006 | Cohn et al. | |
| 2007/0137611 A1 | 6/2007 | Yu et al. | |
| 2008/0022982 A1 * | 1/2008 | Kamiyama | 123/575 |

OTHER PUBLICATIONS

SAE Technical Paper Series 2006-01-1259, Apr. 3-6, 2006.
SAE Technical Paper Series 2007-01-4051, Study on HCCI-SI Combustion Using Fuels Containing Ethanol.
www.altfuels.org/backgrnd/altftype.html.
www.sciam.com/article.cfm?id=what-types-of-alternative.
www.afcee.brooks.af.mil/pro-act/fact/afv.asp.
www.eere.energy.gov/afdc/.
www.necsfueltaxes.com/glossary/index.php.

* cited by examiner

*Primary Examiner*—Mahmoud Gimie
(74) *Attorney, Agent, or Firm*—Fraser Clemens Martin & Miller LLC; J. Douglas Miller (57) ABSTRACT

A fuel injection system for an internal combustion engine is disclosed, the fuel injection system including a plurality of injectors, wherein each of the injectors is adapted to inject at least one of an alternative fuel and a fossil fuel over a full range of operating conditions of the engine.

20 Claims, 5 Drawing Sheets

MULTI-FUEL MULTI-INJECTION SYSTEM FOR AN INTERNAL COMBUSTION ENGINE

FIELD OF THE INVENTION

The invention relates to an internal combustion engine, and more particularly to a multi-fuel multi-injection system for an internal combustion engine which is capable of injecting a fossil fuel and an alternative fuel over a full range of operating conditions of the engine.

BACKGROUND OF THE INVENTION

The automotive industry is continually researching the combustion process of an internal combustion engine to improve a fuel economy and emissions thereof. To optimize performance of the engine, it is important to be able to control the engine on a cycle-to-cycle basis. For engines operating without a conventional spark ignition, commonly known as the homogenous charge compression ignition (HCCI) mode, the main challenge is to maintain a stable start of combustion (SOC) when the engine is operated at steady state and transient conditions. The instability of the SOC is mainly due to difficulties in the control of in-cylinder air-to-fuel mixture temperature on a cycle-to-cycle basis.

Presently, prior art engines utilize an intake heater to control intake air temperature and/or an amount of residual exhaust gas (REG) to regulate engine in-cylinder air-to-fuel mixture temperature. However, a disadvantage of using the intake heater is its slow response time caused by a large time constant of the heater and a transportation delay from the heater to the cylinder. The slow response time results in inaccurate temperature regulation during the transient operation of the engine. On the other hand, using REG provides expeditious regulation for in-cylinder air-to-fuel mixture temperature control. However, a rate of in-cylinder residual exhaust gas is uncontrollable, leading to SOC and indicated mean effective pressure (IMEP) variation.

Furthermore, advancements have been made in the various forms of fuel delivery to provide a desired amount of fuel for combustion in each cylinder of the engine. Such advancements include the introduction of multi-injection fuel systems. One multi-injection fuel system is the dual-injection single-fuel system. The dual-injection single-fuel system includes two fuel injectors for each cylinder. One is a direct injector and the other is a port fuel injector. The dual-injection single-fuel system is designed to improve full load performance of the engine at high engine speed operating conditions.

Another multi-injection fuel system is the dual-injection dual-fuel system. The dual-injection dual-fuel system utilizes two different, but comparable fuels. Typically, due to its high octane quality, ethanol has been used in conjunction with gasoline in a dual-injection dual-fuel system. The benefit of the dual-injection dual-fuel system is the capability to increase the combustion efficiency, while suppressing engine knock. The benefit is derived from directly injecting higher octane ethanol fuel into a combustion chamber of the engine. The ethanol has substantial air charge cooling, resulting from its high heat of vaporization. However, the prior art dual-injection dual-fuel system is limited to injecting gasoline into an intake port of the engine.

It is desirable to produce an internal combustion engine including a plurality of fuel injectors adapted to inject a fossil fuel and an alternative fuel, wherein an efficiency thereof is maximized, and emissions and knock thereof are minimized.

SUMMARY OF THE INVENTION

In concordance and agreement with the present invention, an internal combustion engine including a plurality of fuel injectors adapted to inject a fossil fuel and an alternative fuel, wherein an efficiency thereof is maximized, and emissions and knock thereof are minimized, has surprisingly been discovered.

In one embodiment, the fuel injection system comprises a first injector adapted to receive at least one of a first stream of a first fuel from a source of the first fuel and a first stream of a second fuel from a source of the second fuel, wherein the first injector injects at least one of the first stream of the first fuel and the first stream of the second fuel into an intake path of a cylinder; a second injector adapted to receive at least one of a second stream of a first fuel from the source of the first fuel and a second stream of the second fuel from the source of the second fuel, wherein the second injector injects at least one of the second stream of the first fuel and the second stream of the second fuel into the cylinder; and a control system adapted to control a combustion in the cylinder over a full range of operating conditions of an engine, wherein an amount of at least one of the first fuel and the second fuel is provided to the cylinder over the full range of operating conditions of the engine.

In another embodiment, the fuel injection system comprises a first injector adapted to receive a first stream of a first fuel from a source of the first fuel and a first stream of a second fuel from a source of the second fuel, wherein the first injector injects at least one of the first stream of the first fuel and the first stream of the second fuel into an intake path of a cylinder; and a second injector adapted to receive a second stream of the first fuel and a second stream of the second fuel, wherein the second injector injects the at least one of the second stream of the first fuel and the second stream of the second fuel into the cylinder.

In another embodiment, the fuel injection system comprises a first injector adapted to receive a first stream of a first fuel from a source of the first fuel, wherein the first injector injects the first stream of the first fuel into an intake path of a cylinder; a second injector adapted to receive a first stream of a second fuel from a source of the second fuel, wherein the second injector injects the first stream of the second fuel into the intake path of the cylinder; a third injector adapted to receive a second stream of the first fuel, wherein the third injector injects the second stream of the first fuel into the cylinder; and a fourth injector adapted to receive a second stream of the second fuel, wherein the fourth injector injects the second stream of the second fuel into the cylinder.

BRIEF DESCRIPTION OF THE DRAWINGS

The above, as well as other objects and advantages of the invention, will become readily apparent to those skilled in the art from reading the following detailed description of various embodiments of the invention when considered in the light of the accompanying drawings in which.

DETAILED DESCRIPTION OF THE PREFERRED EMBODIMENT

The following detailed description and appended drawings describe and illustrate various embodiments of the invention. The description and drawings serve to enable one skilled in the art to make and use the invention, and are not intended to limit the scope of the invention in any manner.

Figure 1:
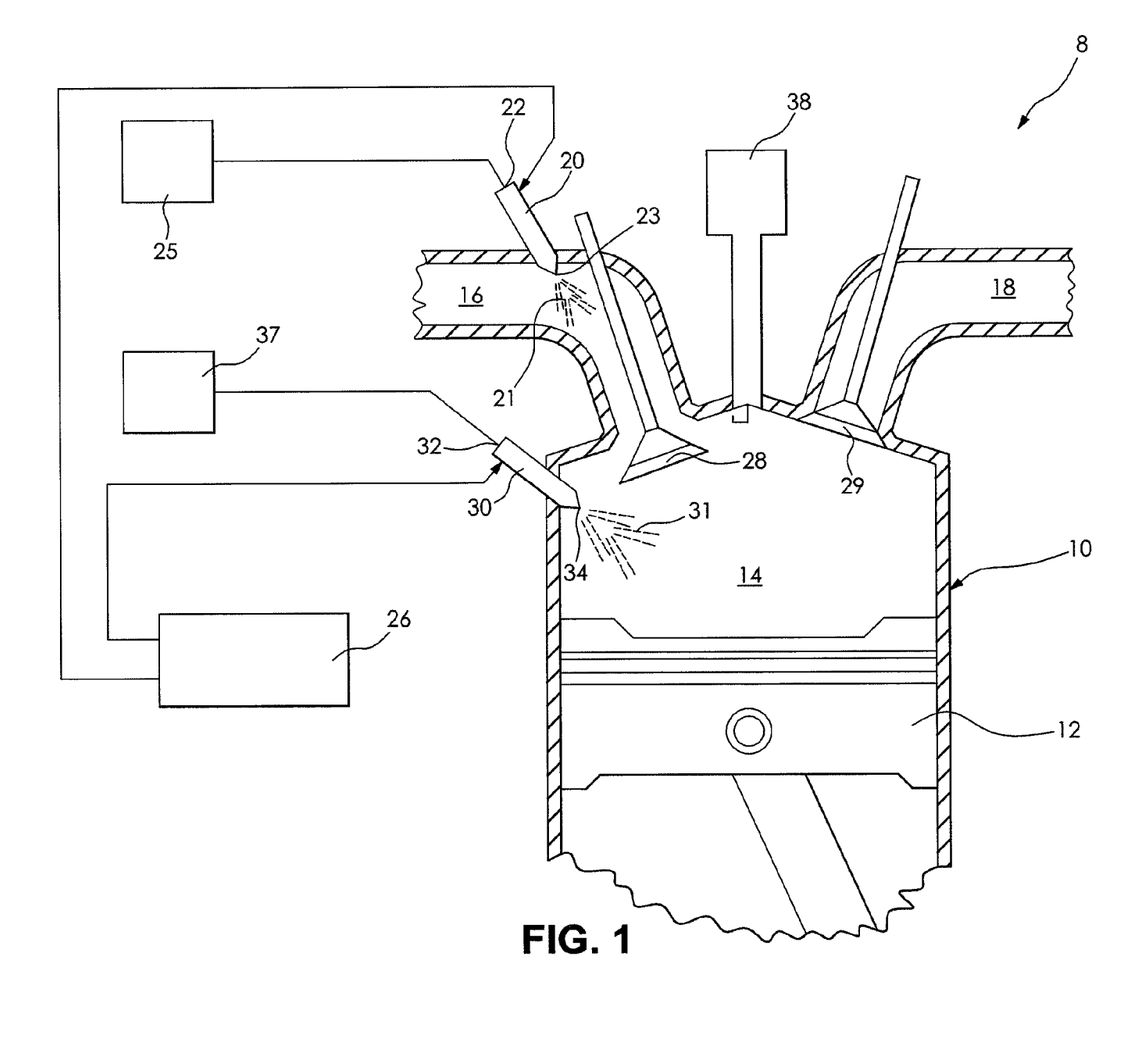
FIG. 1 is a schematic diagram of a cylinder of an internal combustion engine including a direct injector and a port fuel injector according to an embodiment of the invention.

FIG. 1 shows an injection system 8 for a cylinder 10 of an internal combustion engine according to an embodiment of the invention. It is understood that the internal combustion engine can have additional cylinders as desired. The cylinder 10 has a hollow interior with a piston 12 slideably disposed therein. The piston 12 and a wall of the cylinder 10 cooperate to define a combustion chamber 14 therebetween. The cylinder 10 includes an intake path 16 and an exhaust path 18. It is understood that the cylinder can include additional intake paths and exhaust paths if desired.

In the embodiment shown, the intake path 16 of the cylinder 10 includes a first injector 20. The first injector 20 is a so-called port fuel injector (PFI) adapted to inject a first stream of a first fuel 21 into the intake path 16. As shown, the first injector 20 includes a fluid inlet 22 and a spaced apart fluid outlet nozzle 23. The fluid inlet 22 is in fluid communication with a source of the first fuel 25. The fluid outlet 23 is in fluid communication with the intake path 16 of the cylinder 10. It is understood that the first fuel 21 can be any fuel such as an alternative fuel and a fossil fuel, for example. As used herein, the term alternative fuel refers to an alcohol-based fuel in a liquid state such as an ethanol, a methanol, a butanol, any blend thereof, and the like, for example, and a non-alcohol based fuel in a liquid state such as a liquefied petroleum gas, a liquefied hydrogen, a compressed hydrogen, a compressed natural gas, a liquefied natural gas, a biodiesel, and the like, for example. It is also understood that the term fossil fuel, as used herein, refers to a fuel in a liquid state such as a gasoline, a gasoline blend, a diesel, a diesel blend, and the like, for example. The first injector 20 delivers injected fuel in proportion to a pulse width of a signal received from a control system 26 via at least one electronic driver. The intake path 16 permits a flow of air from a throttle body (not shown) and a flow of the first fuel 25 therethrough. A valve 28 is disposed in the intake path 16 of the cylinder 10 to selectively open and close the intake path 16. The exhaust path 18 permits a flow of a gaseous exhaust therethrough. A valve 29 is disposed in the exhaust path 18 of the cylinder 10 to selectively open and close the exhaust path 18.

The cylinder 10 includes a second injector 30. The second injector 30 is a so-called direct injector (DI) adapted to inject a first stream of a second fuel 31 into the combustion chamber 14. Although the second injector 30 illustrated is disposed in a side wall of the cylinder 10, it is understood that the second injector 30 can be disposed elsewhere in the cylinder 10 such as overhead of the piston 12 and near the intake path 16, for example. As shown, the second injector 30 includes a fluid inlet 32 and a spaced apart fluid outlet nozzle 34. The fluid inlet 32 is in fluid communication with a source of the second fuel 37. Although the source of the first fuel 25 and the source of the second fuel 37 shown are separate, it is understood that the first fuel 21 and the second fuel 31 can be stored in a single tank and separated by reforming a first fuel/second fuel blend using a fuel separator. The fluid outlet 34 is in fluid communication with the combustion chamber 14. It is understood that the second fuel 31 can be any fuel such as an alternative fuel and a fossil fuel, for example. The second injector 30 delivers injected fuel in proportion to a pulse width of a signal received from the control system 26 via at least one electronic driver.

The control system 26 is adapted to monitor engine operating parameters via various sensors (not shown) to control an injection timing, an injection duration, and an injection rate of the injectors 20, 30, and a fuel ratio of the first fuel 21 to the second fuel 31. Accordingly, the instantaneous demand of the ratio of each fuel and injection type and any combinations thereof can be controlled in real time by the control system 26. An ignition coil 38 may be disposed in the combustion chamber 14 of the cylinder 10. The ignition coil 38 enhances an ignition timing control of the engine at certain conditions such as during cold start and low load operation, for example.

Figure 2:
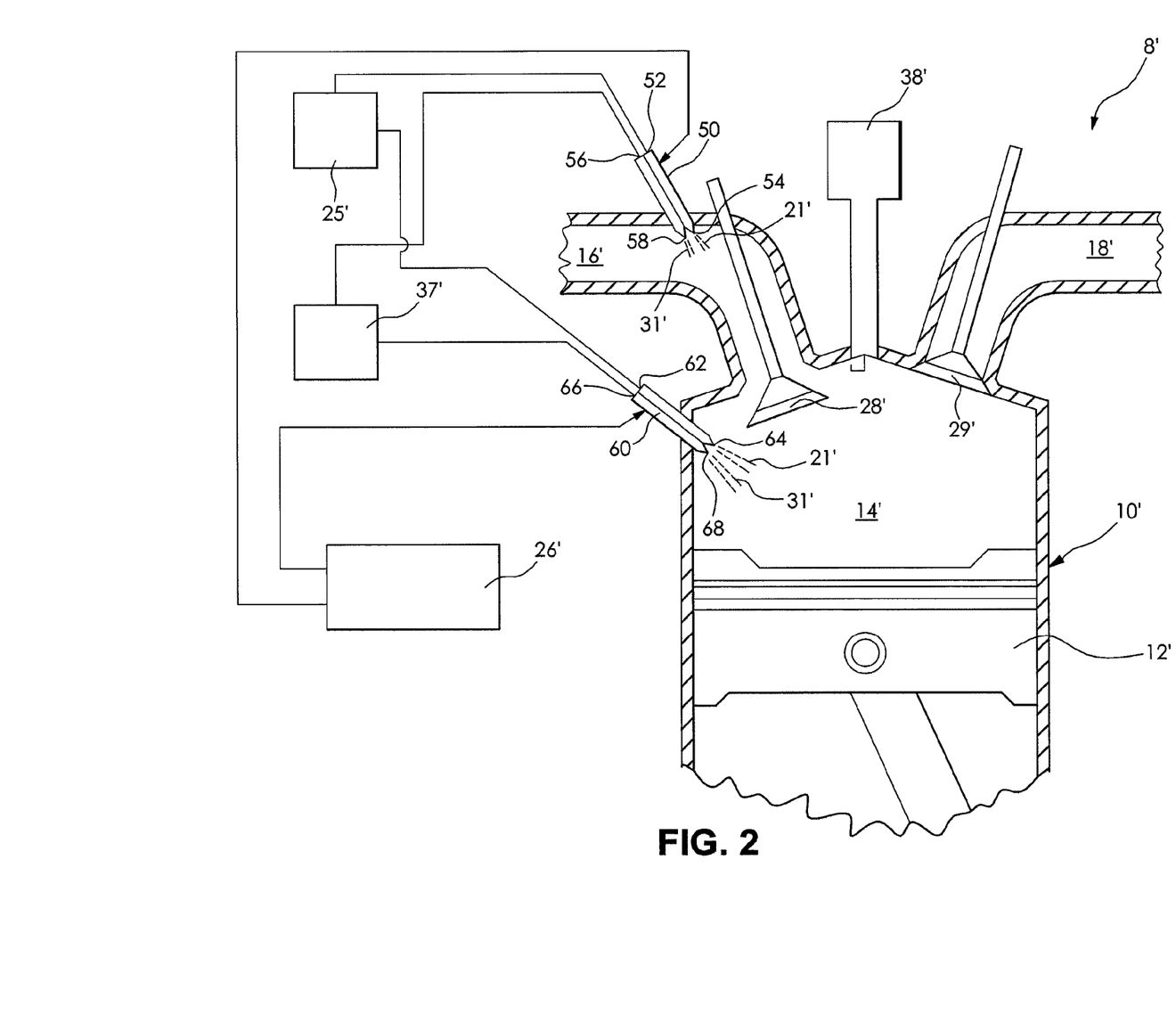
FIG. 2 is a schematic diagram of a cylinder according to another embodiment of the invention.

FIG. 2 shows another embodiment of the invention which includes a fuel injection system similar to that shown in FIG. 1. Reference numerals for similar structure in respect of the description of FIG. 1 are repeated in FIG. 2 with a prime (') symbol.

FIG. 2 shows an injection system 8' for a cylinder 10' of an internal combustion engine according to an embodiment of the invention. It is understood that the internal combustion engine can have additional cylinders as desired. The cylinder 10' has a hollow interior with a piston 12' slideably disposed therein. The piston 12' and a wall of the cylinder 10' cooperate to define a combustion chamber 14' therebetween. The cylinder 10' includes an intake path 16' and an exhaust path 18'. It is understood that the cylinder 10' can include additional intake paths and exhaust paths if desired.

In the embodiment shown, the intake path 16' includes a first injector 50. The first injector 50 is a so-called port fuel injector (PFI) adapted to inject a first stream of a first fuel 21' and a first stream of a second fuel 31' into the intake path 16'. As shown, the first injector 50 includes a first fluid inlet 52 and a spaced apart first fluid outlet nozzle 54. The first fluid inlet 52 is in fluid communication with a source of the first fuel 25'. The first fluid outlet 54 is in fluid communication with the intake path 16' of the cylinder 10'. It is understood that the first fuel 21' can be any fuel such as an alternative fuel and a fossil fuel, for example. The first injector 50 further includes a second fluid inlet 56 and a spaced apart second fluid outlet nozzle 58. The second fluid inlet 56 is in fluid communication with a source of the second fuel 37'. Although the source of the first fuel 25' and the source of the second fuel 37' shown are separate, it is understood that the first fuel 21' and the second fuel 31' can be stored in a single tank and separated by reforming a first fuel/second fuel blend using a fuel separator. The second fluid outlet 58 is in fluid communication with the intake path 16' of the cylinder 10'. It is understood that the second fuel 31' can be any fuel such as an alternative fuel and a fossil fuel, for example.

The first injector 50 delivers injected fuel in proportion to a pulse width of a signal received from a control system 26' via at least one electronic driver. The intake path 16' permits a flow of air from a throttle body (not shown) and a flow of the first fuel 21' and a flow of the second fuel 31' therethrough. A valve 28' is disposed in the intake path 16' of the cylinder 10' to selectively open and close the intake path 16'. The exhaust path 18' permits a flow of a gaseous exhaust therethrough. A valve 29' is disposed in the exhaust path 18' of the combustion chamber 14' to selectively open and close the exhaust path 18'.

The cylinder 10' includes a second injector 60. The second injector 60 is a so-called direct injector (DI) adapted to inject a second stream of the first fuel 21' and a second stream of the second fuel 31' into the combustion chamber 14'. Although the second injector 60 illustrated is disposed in a side wall of the cylinder 10', it is understood that the second injector 60 can be disposed elsewhere in the cylinder 10' such as overhead of the piston 12' and near the intake path 16', for example. As shown, the second injector 60 includes a first fluid inlet 62 and a spaced apart first fluid outlet nozzle 64. The first fluid inlet 62 is in fluid communication with the source of the first fuel 25'. The first fluid outlet 64 is in fluid communication with the combustion chamber 14'. The second injector 60 further includes a second fluid inlet 66 and a spaced apart second fluid outlet nozzle 68. The second fluid inlet 66 is in fluid communication with the source of the second fuel 37'. The second fluid outlet 68 is in fluid communication with the combustion chamber 14'. The second injector 60 delivers injected fuel in proportion to a pulse width of a signal received from the control system 26' via at least one electronic driver.

The control system 26' is adapted to monitor engine operating parameters via various sensors (not shown) to control an injection timing, an injection duration, and an injection rate of the injectors 50, 60, and a fuel ratio of the first fuel 21' to the second fuel 31'. Accordingly, the instantaneous demand of the ratio of each fuel and injection type and any combinations thereof can be controlled in real time by the control system 26'. An ignition coil 38' may be disposed in the combustion chamber 14' of the cylinder 10'. The ignition coil 38' enhances an ignition timing control of the engine at certain conditions such as during cold start and low load operation, for example.

Figure 3:
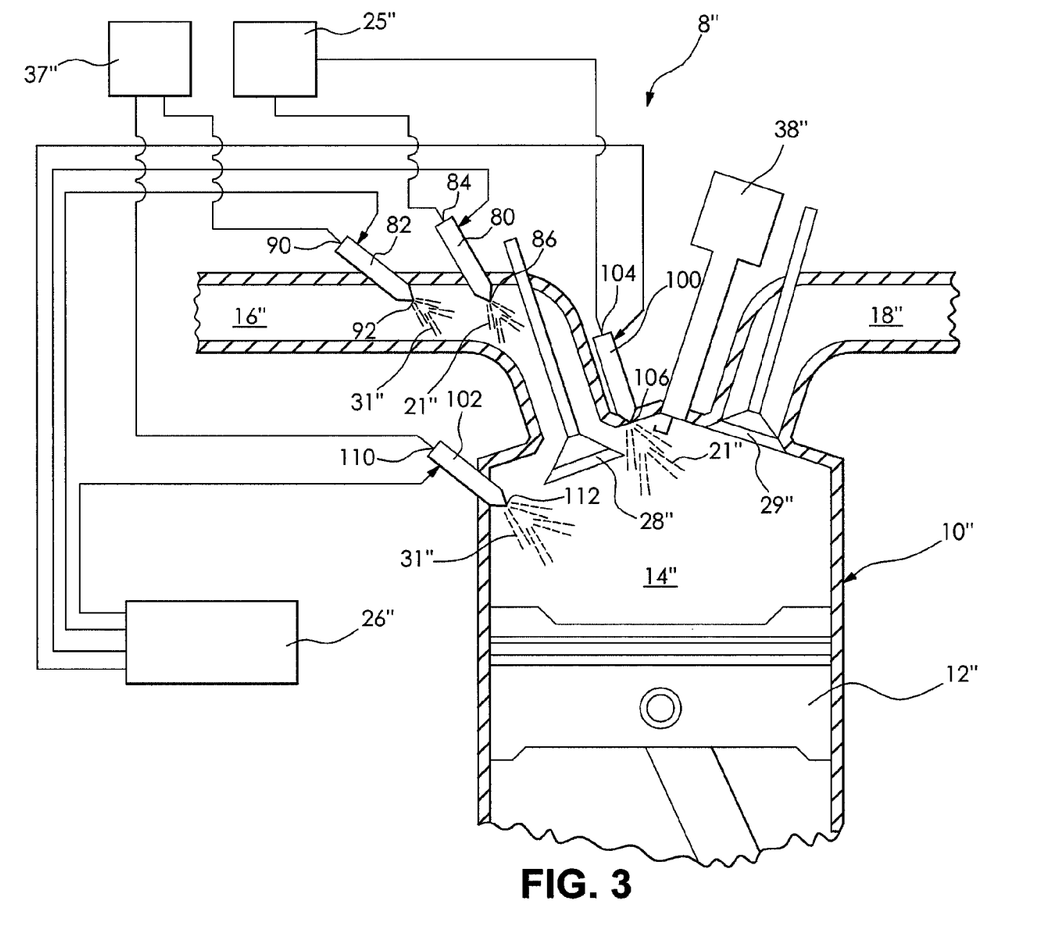
FIG. 3 is a schematic diagram of a cylinder according to another embodiment of the invention.

FIG. 3 shows another embodiment of the invention which includes a fuel injection system similar to that shown in FIGS. 1 and 2. Reference numerals for similar structure in respect of the description of FIGS. 1 and 2 are repeated in FIG. 3 with a prime (") symbol.

FIG. 3 shows an injection system 8" for a cylinder 10" of an internal combustion engine according to an embodiment of the invention. It is understood that the internal combustion engine can have additional cylinders as desired. The cylinder 10" has a hollow interior with a piston 12" slideably disposed therein. The piston 12" and a wall of the cylinder 10" cooperate to define a combustion chamber 14" therebetween. The cylinder 10" includes an intake path 16" and an exhaust path 18". It is understood that the cylinder 10" can include additional intake paths and exhaust paths if desired.

In the embodiment shown, the intake path 16" includes a first injector 80 and a second injector 82. The first injector 80 and the second injector 82 are so-called port fuel injectors (PFI) adapted to inject a first stream of a first fuel 21" and a first stream of a second fuel 31", respectively, into the intake path 16'. As shown, the first injector 80 includes a fluid inlet 84 and a spaced apart fluid outlet nozzle 86. The fluid inlet 84 is in fluid communication with a source of the first fuel 25". The fluid outlet 86 is in fluid communication with the intake path 16" of the cylinder 10". It is understood that the first fuel 21" can be any fuel such as an alternative fuel and a fossil fuel, for example.

The second injector 82 includes a fluid inlet 90 and a spaced apart fluid outlet nozzle 92. The fluid inlet 90 is in fluid communication with a source of the second fuel 37". Although the source of the first fuel 25" and the source of the second fuel 37" shown are separate, it is understood that the first fuel 21" and the second fuel 31" can be stored in a single tank and separated by reforming a first fuel/second fuel blend using a fuel separator. The fluid outlet 92 is in fluid communication with the intake path 16" of the cylinder 10". It is understood that the second fuel 31" can be any fuel such as an alternative fuel and a fossil fuel, for example.

The first injector 80 and the second injector 82 deliver injected fuel in proportion to a pulse width of a signal received from a control system 26" via at least one electronic driver. The intake path 16" permits a flow of air from a throttle body (not shown) and a flow of the first fuel 21" and a flow of the second fuel 31" therethrough. A valve 28" is disposed in the intake path 16" of the cylinder 10" to selectively open and close the intake path 16'. The exhaust path 18" permits a flow of a gaseous exhaust therethrough. A valve 29" is disposed in the exhaust path 18" of the cylinder 10" to selectively open and close the exhaust path 18".

The cylinder 10" includes a third injector 100 and a fourth injector 102. The third injector 100 and the fourth injector 102 are so-called direct injectors (DI) adapted to inject a second stream of the first fuel 21" and a second stream of the second fuel 31", respectively, into the combustion chamber 14". Although the third injector 100 and the fourth injector 102 illustrated are disposed overhead of the piston 12" near the intake path 16" and in a side wall of the cylinder 10", respectively, it is understood that the third injector 100 and the fourth injector 102 can be disposed elsewhere in the cylinder 10" as desired. As shown, the third injector 100 includes a fluid inlet 104 and a spaced apart fluid outlet nozzle 106. The fluid inlet 104 is in fluid communication with the source of the first fuel 25". The fluid outlet 106 is in fluid communication with the combustion chamber 14".

The fourth injector 102 includes a fluid inlet 110 and a spaced apart fluid outlet nozzle 112. The fluid inlet 110 is in fluid communication with the source of the second fuel 37". The fluid outlet 112 is in fluid communication with the combustion chamber 14". The third injector 100 and the fourth injector 102 deliver injected fuel in proportion to a pulse width of a signal received from the control system 26" via at least one electronic driver.

The control system 26" is adapted to monitor engine operating parameters via various sensors (not shown) to control an injection timing, an injection duration, and an injection rate of the injectors 80, 82, 100, 102, and a fuel ratio of the first fuel 21" to the second fuel 31". Accordingly, the instantaneous demand of the ratio of each fuel and injection type and any combinations thereof up to all four injectors 80, 82, 100, 102 can be controlled in real time by the control system 26". An ignition coil 38" may be disposed in the combustion chamber 14" of the cylinder 10'. The ignition coil 38" enhances an ignition timing control of the engine at certain conditions such as during cold start and low load operation, for example.

Figure 4:
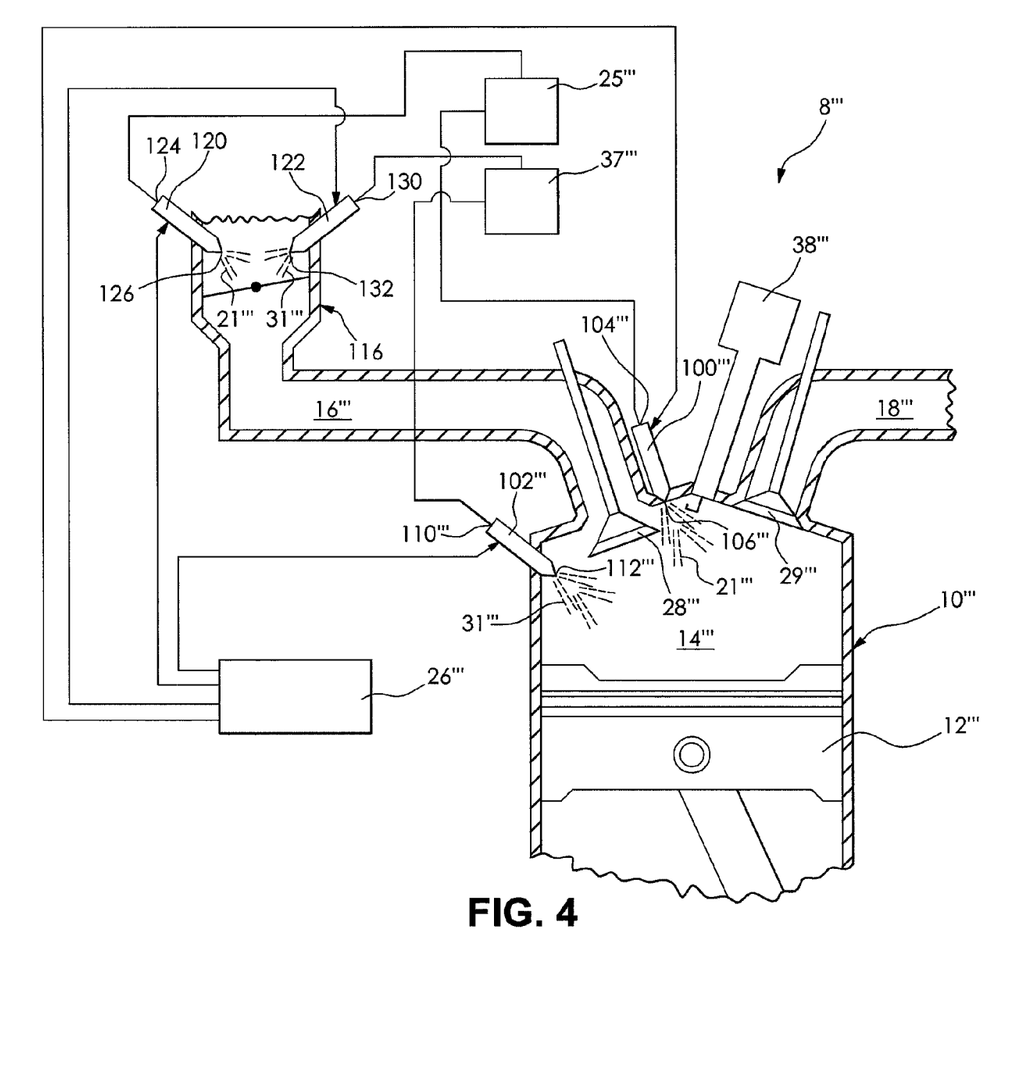
FIG. 4 is a schematic diagram of a cylinder according to another embodiment of the invention.

FIG. 4 shows another embodiment of the invention which includes a fuel injection system similar to that shown in FIGS. 1, 2, and 3. Reference numerals for similar structure in respect of the description of FIGS. 1, 2, and 3 are repeated in FIG. 4 with a prime ('") symbol.

FIG. 4 shows an injection system 8'" for a cylinder 10'" of an internal combustion engine according to an embodiment of the invention. It is understood that the internal combustion engine can have additional cylinders 10'" as desired. The cylinder 10'" has a hollow interior with a piston 12'" slideably disposed therein. The piston 12'" and a wall of the cylinder 10'" cooperate to define a combustion chamber 14'" therebetween. The cylinder 10'" includes an intake path 16'" and an exhaust path 18'". It is understood that the cylinder 10'" can include additional intake paths and exhaust paths if desired. The intake path 16'" is in fluid communication with a throttle body 116 of the engine. Accordingly, the throttle body 116 is in fluid communication with all cylinders 10'" of the engine. The throttle body 116 is adapted to selectively permit a flow of air therethrough.

In the embodiment shown, the throttle body 116 includes a first injector 120 and a second injector 122 disposed therein. The first injector 120 and the second injector 122 are so-called throttle body injectors (TBI) adapted to inject a first stream of a first fuel 21''' and a first stream of a second fuel 31''', respectively, into the throttle body 116 or upstream of the throttle body 116. As shown, the first injector 120 includes a fluid inlet 124 and a spaced apart fluid outlet nozzle 126. The fluid inlet 124 is in fluid communication with a source of the first fuel 25'''. The fluid outlet 126 is in fluid communication with the throttle body 116. It is understood that the first fuel 21'''can be any fuel such as an alternative fuel and a fossil fuel, for example.

The second injector 122 includes a fluid inlet 130 and a spaced apart fluid outlet nozzle 132. The fluid inlet 130 is in fluid communication with a source of the second fuel 37'''. Although the source of the first fuel 25''' and the source of the second fuel 37''' shown are separate, it is understood that the first fuel 21''' and the second fuel 31''' can be stored in a single tank and separated by reforming a first fuel/second fuel blend using a fuel separator. The fluid outlet 132 is in fluid communication with the throttle body 116. It is understood that the second fuel 31''' can be any fuel such as an alternative fuel and a fossil fuel, for example.

The first injector 120 and the second injector 122 deliver injected fuel in proportion to a pulse width of a signal received from a control system 26''' via at least one electronic driver. The intake path 16''' permits the flow of air and a flow of the first fuel 21''' and a flow of the second fuel 31''' from the throttle body 116 to the cylinder 10'''. A valve 28''' is disposed in the intake path 16''' of the cylinder 10''' to selectively open and close the intake path 16'''. The exhaust path 18''' permits a flow of a gaseous exhaust therethrough. A valve 29''' is disposed in the exhaust path 18''' of the cylinder 10''' to selectively open and close the exhaust path 18'''.

The cylinder 10''' includes a third injector 100''' and a fourth injector 102'''. The third injector 100''' and the fourth injector 102''' are so-called direct injectors (DI) adapted to inject a second stream of the first fuel 21''' and a second stream of the second fuel 31''', respectively, into the combustion chamber 14'''. Although the third injector 100''' and the fourth injector 102''' illustrated are disposed overhead of the piston 12''' near the intake path 16''' and in a side wall of the cylinder 10''', respectively, it is understood that the third injector 100''' and the fourth injector 102''' can be disposed elsewhere in the cylinder 10''' as desired. As shown, the third injector 100''' includes a fluid inlet 104''' and a spaced apart fluid outlet nozzle 106'''. The fluid inlet 104''' is in fluid communication with the source of the first fuel 25'''. The fluid outlet 106''' is in fluid communication with the combustion chamber 14'''.

The fourth injector 102''' includes a fluid inlet 110''' and a spaced apart fluid outlet nozzle 112'''. The fluid inlet 110''' is in fluid communication with the source of the second fuel 37'''. The fluid outlet 112''' is in fluid communication with the combustion chamber 14'''. The third injector 100''' and the fourth injector 102''' deliver injected fuel in proportion to a pulse width of a signal received from the control system 26''' via at least one electronic driver.

The control system 26''' is adapted to monitor engine operating parameters via various sensors (not shown) to control an injection timing, an injection duration, and an injection rate of the injectors 100''', 102''', 120, 122, and a fuel ratio of the first fuel 21''' to the second fuel 31'''. Accordingly, the instantaneous demand of the ratio of each fuel and injection type and any combinations thereof up to all four injectors 100''', 102''', 120, 122 can be controlled in real time by the control system 26'''. An ignition coil 38''' may be disposed in the combustion chamber 14''' of the cylinder 10'''. The ignition coil 38''' enhances an ignition timing control of the engine at certain conditions such as during cold start and low load operation, for example.

Figure 5:
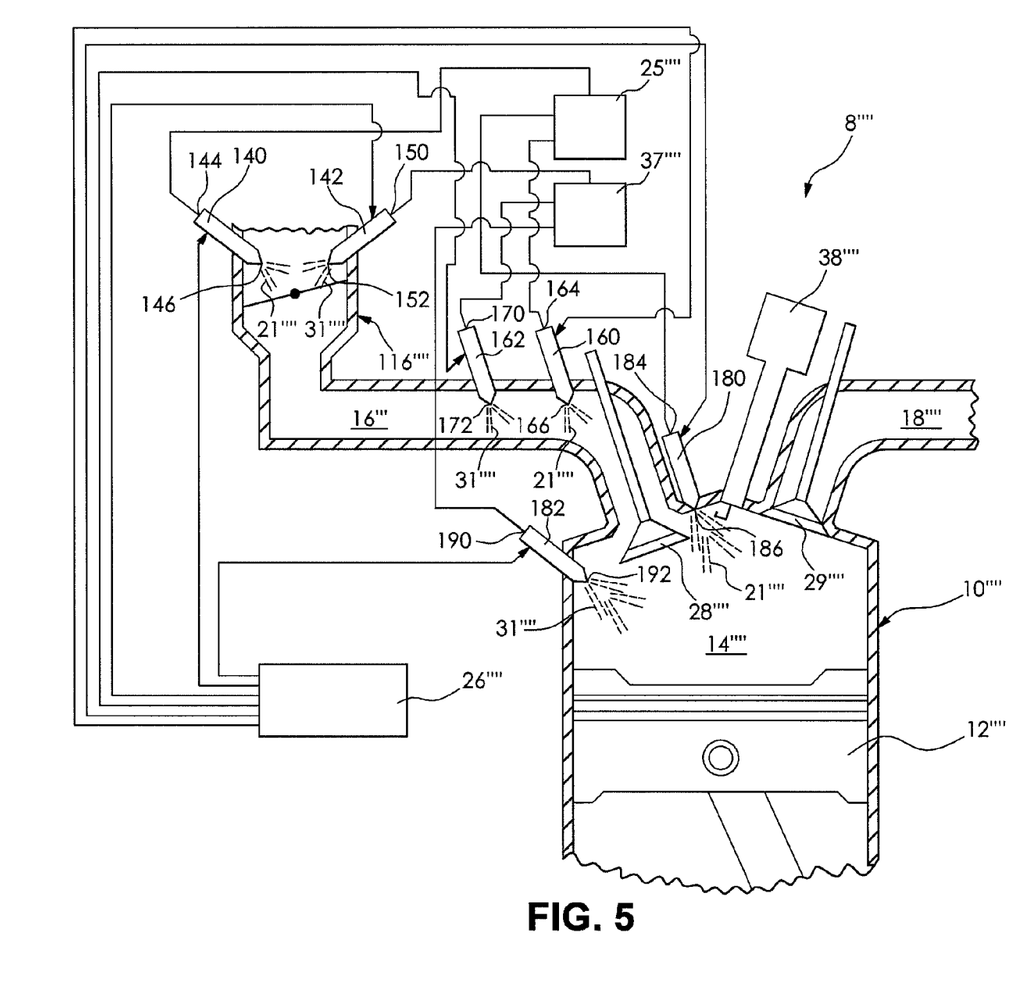
FIG. 5 is a schematic diagram of a cylinder according to another embodiment of the invention.

FIG. 5 shows another embodiment of the invention which includes a fuel injection system similar to that shown in FIGS. 1, 2, 3, and 4. Reference numerals for similar structure in respect of the description of FIGS. 1, 2, 3, and 4 are repeated in FIG. 5 with a prime ('''') symbol.

FIG. 5 shows an injection system 8'''' for a cylinder 10'''' of an internal combustion engine according to an embodiment of the invention. It is understood that the internal combustion engine can have additional cylinders 10'''' as desired. The cylinder 10'''' has a hollow interior with a piston 12'''' slideably disposed therein. The piston 12'''' and a wall of the cylinder 10'''' cooperate to define a combustion chamber 14'''' therebetween. The cylinder 10'''' includes an intake path 16'''' and an exhaust path 18''''. It is understood that the cylinder 10'''' can include additional intake paths and exhaust paths if desired. The intake path 16'''' is in fluid communication with a throttle body 116'''' of the engine. Accordingly, the throttle body 116'''' is in fluid communication with all cylinders 10'''' of the engine. The throttle body 116'''' is adapted to selectively permit a flow of air therethrough.

In the embodiment shown, the throttle body 116'''' includes a first injector 140 and a second injector 142 disposed therein. The first injector 140 and the second injector 142 are so-called throttle body injectors (TBI) adapted to inject a first stream of a first fuel 21'''' and a first stream of a second fuel 31'''', respectively, into the throttle body 116'''' or upstream of the throttle body 116''''. As shown, the first injector 140 includes a fluid inlet 144 and a spaced apart fluid outlet nozzle 146. The fluid inlet 144 is in fluid communication with a source of the first fuel 25''''. The fluid outlet 146 is in fluid communication with the throttle body 116''''. It is understood that the first fuel 21'''' can be any fuel such as an alternative fuel and a fossil fuel, for example.

The second injector 142 includes a fluid inlet 150 and a spaced apart fluid outlet nozzle 152. The fluid inlet 150 is in fluid communication with a source of the second fuel 37''''. Although the source of the first fuel 25'''' and the source of the second fuel 37'''' shown are separate, it is understood that the first fuel 21'''' and the second fuel 31'''' can be stored in a single tank and separated by reforming a first fuel/second fuel blend using a fuel separator. The fluid outlet 152 is in fluid communication with the throttle body 116''''. It is understood that the second fuel 31'''' can be any fuel such as an alternative fuel and a fossil fuel, for example.

The first injector 140 and the second injector 142 deliver injected fuel in proportion to a pulse width of a signal received from a control system 26'''' via at least one electronic driver. The intake path 16'''' permits the flow of air and a flow of the first fuel 21'''' and a flow of the second fuel 31'''' from the throttle body 116'''' to the cylinder 10''''. A valve 28'''' is disposed in the intake path 16'''' of the cylinder 10'''' to selectively open and close the intake path 16''''. The exhaust path 18'''' permits a flow of a gaseous exhaust therethrough. A valve 29'''' is disposed in the exhaust path 18'''' of the cylinder 10'''' to selectively open and close the exhaust path 18''''.

In the embodiment shown, the intake path 16'''' further includes a third injector 160 and a fourth injector 162. The third injector 160 and the fourth injector 162 are so-called port fuel injectors (PFI) adapted to inject a second stream of the first fuel 21'''' and a second stream of the second fuel 31'''', respectively, into the intake path 16''''. As shown, the third injector 160 includes a fluid inlet 164 and a spaced apart fluid outlet nozzle 166. The fluid inlet 164 is in fluid communication with a source of the first fuel 25''''. The fluid outlet 166 is in fluid communication with the intake path 16'''' of the cylinder 10''''. It is understood that the first fuel 21'''' can be any fuel such as an alternative fuel and a fossil fuel, for example.

The fourth injector 162 includes a fluid inlet 170 and a spaced apart fluid outlet nozzle 172. The fluid inlet 170 is in fluid communication with a source of the second fuel 37''''. The fluid outlet 172 is in fluid communication with the intake path 16'''' of the cylinder 10''''. It is understood that the second fuel 31'''' can be any fuel such as an alternative fuel and a fossil fuel, for example. The third injector 160 and the fourth injector 162 deliver injected fuel in proportion to a pulse width of a signal received from the control system 26'''' via at least one electronic driver.

The cylinder 10'''' includes a fifth injector 180 and a sixth injector 182. The fifth injector 180 and the sixth injector 182 are so-called direct injectors (DI) adapted to inject a third stream of the first fuel 21'''' and a third stream of the second fuel 31'''', respectively, into the combustion chamber 14''''. Although the fifth injector 180 and the sixth injector 182 illustrated are disposed overhead of the piston 12'''' near the intake path 16'''' and in a side wall of the cylinder 10'''', respectively, it is understood that the fifth injector 180 and the sixth injector 182 can be disposed elsewhere in the cylinder 10'''' as desired. As shown, the fifth injector 180 includes a fluid inlet 184 and a spaced apart fluid outlet nozzle 186. The fluid inlet 184 is in fluid communication with the source of the first fuel 25''''. The fluid outlet 186 is in fluid communication with the combustion chamber 14''''.

The sixth injector 182 includes a fluid inlet 190 and a spaced apart fluid outlet nozzle 192. The fluid inlet 190 is in fluid communication with the source of the second fuel 37''''. The fluid outlet 192 is in fluid communication with the combustion chamber 14''''. The fifth injector 180 and the sixth injector 182 deliver injected fuel in proportion to a pulse width of a signal received from the control system 26'''' via at least one electronic driver.

The control system 26'''' is adapted to monitor engine operating parameters via various sensors (not shown) to control an injection timing, an injection duration, and an injection rate of the injectors 140, 142, 160, 162, 180, 182, and a fuel ratio of the first fuel 21'''' to the second fuel 31''''. Accordingly, the instantaneous demand of the ratio of each fuel and injection type and any combinations thereof up to all six injectors 140, 142, 160, 162, 180, 182 can be controlled in real time by the control system 26''''. An ignition coil 38'''' may be disposed in the combustion chamber 14'''' of the cylinder 10''''. The ignition coil 38'''' enhances an ignition timing control of the engine at certain conditions such as during cold start and low load operation, for example.

Since operation of the fuel injection 8 for a cylinder 10 of an internal combustion engine illustrated in FIG. 1 is substantially similar to the fuel injection system 8', 8'', 8''', 8'''' illustrated in FIGS. 2 thru 5, for simplicity, only the operation of the fuel injection system 8 will be described hereinafter.

An operation is discussed herein below for a four-stroke internal combustion engine. It is understood that the above described invention can be used with other types of internal combustion engines as desired. The four-strokes involved in the combustion cycle of the engine are: the intake stroke, the compression stroke, the power stroke, and the exhaust stroke.

On the intake stroke, the piston 12 is caused to recede within the cylinder 10 and the valve 28 is caused to open. The fuel injection system 8 delivers a mixture of the first fuel 21, the second fuel 31, and air to the cylinder 10. Accordingly, the air/fuel mixture is urged by atmospheric pressure into the cylinder 10. After the piston 12 reaches a lower limit of travel or bottom dead center, the valve 28 is caused to close and the piston 12 is caused to return to an initial position. The valve 29 disposed in the exhaust path 18 also remains closed, so the cylinder 10 is sealed. As the piston returns, the air/fuel mixture is compressed. Thus, a pressure in the cylinder 10 is also increased. The compression process also causes the air/fuel mixture to increase in temperature. As the piston 12 reaches an upper limit of travel or top dead center on the compression stroke, an electric spark is produced by the ignition coil 38 to ignite the air/fuel mixture. The mixture burns rapidly and the pressure in the cylinder 10 increases. Accordingly, the pressure causes the piston 12 to recede within the cylinder 10. A power impulse is then transmitted down through the piston 12 to the rest of the engine. Thereafter, as the piston 12 reaches the lower limit of travel, the valve 19 opens. As the piston 12 is caused to return to the initial position upon the exhaust stroke, the burned gases are forced out of the cylinder 10 into the exhaust path 18. When the piston 12 reaches the upper limit of travel, the valve 19 closes, and the valve 28 opens. The cycle then repeats again with the intake stroke. The four strokes are continuously repeated during the operation of the engine.

During the operation of the internal combustion engine, relative proportions of the first fuel 21 to the second fuel 31 and fuel injection type may be widely varied. The variations in the fuel ratio and injection type ratio may be based on an operating condition of the engine such as temperature, load, speed, throttle position, fuel quality, and the like, for example.

In certain operating conditions of the engine, a proportionate amount of the first fuel 21 provided to the cylinder 10 may be miniscule such as about 0.0% of the total fuel to be combusted, while a proportionate amount of the second fuel 31 provided to the cylinder 10 may be significant such as about 100% of the total fuel to be combusted. On the other hand in other operating conditions of the engine, the proportionate amount of the first fuel 21 provided to the cylinder 10 may be significant such as about 100%, whereas the proportionate amount of the second fuel 31 provided to the cylinder 10 may be miniscule such as about 0.0%. The above describes two extreme scenarios to generally illustrate the range of the proportionate amounts of the first fuel 21 and the second fuel 31, it is understood that the engine can be operated at a condition in which the proportionate amounts are between the extreme scenarios.

Furthermore, in certain operating conditions of the engine, an amount of the first fuel 21 and the second fuel 31 provided to the cylinder 10 by direct injection may be miniscule such as about 0.0% of the total fuel to be combusted while an amount of the first fuel 21 and the second fuel 31 provided to the cylinder 10 by other means such as port fuel injection and throttle body injection may be significant such as about 100% of the total fuel to be combusted. On the other hand in other operating conditions of the engine, the amount of first fuel 21 and the second fuel 31 provided to the cylinder 10 by direct injection may be significant such as about 100%, whereas the amount of the first fuel 21 and the second fuel 31 provided to the cylinder 10 by other injection means may be miniscule such as about 0.0%. The above describes two extreme scenarios to generally illustrate the range of the amount of first fuel 21 and the second fuel 31 injected by each injector type, it is understood that the engine can be operated at a condition in which the amount of first fuel 21 and the second fuel 31 injected is between the extreme scenarios.

It is understood that engine IMEP and engine combustion duration varies as a function of both the fuel ratio and the injection type ratio. The control of the engine combustion duration results in a more controllable combustion process in the cylinder 10. Since combustion duration is closely related to in-cylinder air-to-fuel mixture temperature, it is also understood the in-cylinder air-to-fuel mixture temperature can also be regulated by varying both the fuel ratio and the injection type ratio. Further, the dual ratio control permits the adjustment of one of the IMEP and the in-cylinder air-to-fuel mixture temperature while the other can be maintained as desired. Additionally, the regulation of the IMEP and the in-cylinder air-to-fuel mixture temperature permits the start of combustion for an HCCI engine operated at either steady state or in transient operation to be controlled cycle-to-cycle.

As illustrated in FIG. 1, the first injector 20 injects the first fuel 21 into the intake path 16. The second injector 30 injects the second fuel 31 into the combustion chamber 14 of the cylinder 10. In the embodiment shown, the first fuel 21 is alternative fuel and the second fuel 31 is one of alternative fuel and fossil fuel. Although the first injector 20 and the second injector 30 shown simultaneously inject the fuels 21, 31, it is understood that the injectors 20, 30 can inject the fuels 21, 31 at separate times. It is also understood that any combination of the injectors 20, 30, can be utilized throughout the operation of the engine.

As illustrated in FIG. 2, the first injector 50 injects the first fuel 21' and the second fuel 31' into the intake path 16'. The second injector 60 injects the first fuel 21' and the second fuel 31' into the combustion chamber 14' of the cylinder 10'. In the embodiment shown, the first fuel 21' is alternative fuel and the second fuel 31' is fossil fuel. Although the first injector 50 and the second injector 60 shown simultaneously inject the fuels 21', 31', it is understood that the injectors 50, 60 can inject the fuels 21', 31' at separate times. It is also understood that each of the injectors 50, 60 can separately inject each of the fuels 21', 31' and that any combination of the injectors 50, 60 can be utilized throughout the operation of the engine.

As illustrated in FIG. 3, the first injector 80 injects the first fuel 21" into the intake path 16". The second injector 82 injects the second fuel 31" into the intake path 16". The third injector 100 injects the first fuel 21" into the combustion chamber 14" of the cylinder 10". The fourth injector 102 injects the second fuel 31" into the combustion chamber 14" of the cylinder 10". In the embodiment shown, the first fuel 21" is alternative fuel and the second fuel 31" is fossil fuel. Although the injectors 80, 82, 100, 102 shown simultaneously inject the fuels 21", 31", it is understood that the injectors 80, 82, 100, 102 can inject the fuels 21", 31" at separate times. It is also understood that any combination of the injectors 80, 82, 100, 102 can be utilized throughout the operation of the engine.

As illustrated in FIG. 4, the first injector 120 injects the first fuel 21''' into the throttle body 116. The second injector 122 injects the second fuel 31''' into the throttle body 116. The third injector 100''' injects the first fuel 21''' into the combustion chamber 14''' of the cylinder 10'''. The fourth injector 102''' injects the second fuel 31''' into the combustion chamber 14''' of the cylinder 10'''. In the embodiment shown, the first fuel 21''' is alternative fuel and the second fuel 31''' is fossil fuel. Although the injectors 100''', 102''', 120, 122 shown simultaneously inject the fuels 21''', 31''', it is understood that the injectors 100''', 102''', 120, 122 can inject the fuels 21''', 31''' at separate times. It is also understood that any combination of the injectors 100''', 102''', 120, 122 can be utilized throughout the operation of the engine.

As illustrated in FIG. 5, the first injector 140 injects the first fuel 21"" into the throttle body 116"". The second injector 142 injects the second fuel 31"" into the throttle body 116"". The third injector 160 injects the first fuel 21"" into the intake path 16"". The fourth injector 162 injects the second fuel 31"" into the intake path 16"". The fifth injector 180 injects the first fuel 21"" into the combustion chamber 14"" of the cylinder 10"". The sixth injector 182 injects the second fuel 31"" into the combustion chamber 14"" of the cylinder 10"". In the embodiment shown, the first fuel 21"" is alternative fuel and the second fuel 31"" is fossil fuel. Although the injectors 140, 142, 160, 162, 180, 182 shown simultaneously inject the fuels 21"", 31"", it is understood that the injectors 140, 142, 160, 162, 180, 182 can inject the fuels 21"", 31"" at separate times. It is also understood that any combination of the injectors 140, 142, 160, 162, 180, 182 can be utilized throughout the operation of the engine.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A fuel injection system comprising:
    a first injector adapted to receive a first stream of a first fuel from a source of the first fuel, wherein the first injector injects the first stream of the first fuel into an intake path of a cylinder;
    a second injector adapted to receive second stream of the first fuel from the source of the first fuel, wherein the second injector injects the second stream of the first fuel into the cylinder; and
    a control system adapted to control a combustion in the cylinder over a fill range of operating conditions of an engine, wherein an amount of the first fuel is provided to the cylinder over the fill range of operating conditions of the engine and wherein the first fuel is an alternative fuel.

2. The fuel injection system according to claim 1, wherein the first injector is one of a port fuel injector and a throttle body injector.

3. The fuel injection system according to claim 1, wherein the first injector receives a first stream of a second fuel, wherein the first injector injects the first stream of the second fuel into the intake path of the cylinder.

4. The fuel injection system according to claim 3, where the second injector receives a second stream of the second fuel, wherein the second injector injects the second stream of the second fuel into the cylinder.

5. The fuel injection system according to claim 4, further comprising a third injector receiving at least one of a third stream of the first fuel and a third stream of the second fuel, wherein the third injector injects at least one of the third stream of the first fuel and the third stream of the second fuel in a manifold of the engine.

6. The fuel injection system according to claim 5, wherein the second fuel is a fossil fuel.

7. A fuel injection system comprising:
    a first injector adapted to receive a first stream of a first fUel from a source of the first fuel and a first stream of a second fuel from a source of the second fuel, wherein the first injector injects the first stream of the first fuel and the first stream of the second fuel into an intake path of a cylinder; and
    a second injector adapted to receive a second stream of the first fuel and a second stream of the second fuel, wherein the second injector selectively injects the second stream of the first fuel and the second stream of the second fuel into the cylinder.

8. The fuel injection system according to claim 7, further comprising a control system adapted to control a combustion in the cylinder over a full range of operating conditions of an engine.

9. The fuel injection system according to claim 7, wherein the first fuel is an alternative fuel.

10. The fuel injection system according to claim 7, wherein the second fuel is a fossil fuel.

11. The fuel injection system according to claim 7, wherein the first injector is one of a port fuel injector and a throttle body injector.

12. The fuel injection system according to claim 7, further comprising at least one injector adapted to receive at least one of a stream of the first fuel and a stream of the second fuel, wherein the at least one injector injects at least one of the stream of the first fuel and the stream of the second fuel in a manifold of an engine.

13. A fuel injection system comprising:
a first injector adapted to receive a first stream of a first fuel from a source of the first fuel, wherein the first injector injects the first stream of the first fuel into an intake path of a cylinder;
a second injector adapted to receive a first strewn of a second fuel from a source of the second fuel, wherein the second injector injects the first stream of the second fuel into the intake path of the cylinder;
a third injector adapted to receive a second stream of the first fuel, wherein the third injector injects the second stream of the first fuel into the cylinder; and
a fourth injector adapted to receive a second stream of the second fuel, wherein the fourth injector injects the second stream of the second fuel into the cylinder.

14. The fuel injection system according to claim 13, further comprising a control system adapted to control a combustion in the cylinder over a full range of operating conditions of an engine.

15. The fuel injection system according to claim 14, wherein the control system is adapted to control at least one of an injection timing, an injection duration, and an injection rate of each of the injectors and a fuel ratio of the first fuel to the second fuel.

16. The fuel injection system according to claim 13, wherein the first fuel is an alternative fuel.

17. The fuel injection system according to claim 13, wherein the second fuel is a fossil fuel.

18. The fuel injection system according to claim 13, further comprising at least one injector adapted to receive at least one of a stream of the first fuel and a stream of the second fuel, wherein the at least one injector injects at least one of the stream of the first fuel and the stream of the second fuel in a manifold of an engine.

19. The fuel injection system according to claim 13, wherein at least one of the first fuel and the second fuel is a fuel in a liquid state.

20. The fuel injection system according to claim 13, wherein at least one of the first injector and the second injector is one of a port fuel injector and a throttle body injector.

* * * * *